(12) United States Patent  (10) Patent No.: US 8,740,740 B2
McCune et al.  (45) Date of Patent: Jun. 3, 2014

(54) RING GEAR MOUNTING ARRANGEMENT WITH OIL SCAVENGE SCHEME

(75) Inventors: Michael E. McCune, Colchester, CT (US); Lawrence E. Portlock, Bethany, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/484,579

(22) Filed: May 31, 2012

(65) Prior Publication Data

US 2012/0238391 A1 Sep. 20, 2012

Related U.S. Application Data

(63) Continuation of application No. 13/437,442, filed on Apr. 2, 2012, which is a continuation of application No. 11/504,220, filed on Aug. 15, 2006.

(51) Int. Cl.
*F16H 57/04* (2010.01)
(52) U.S. Cl.
USPC ............................ 475/159; 475/160; 475/331
(58) Field of Classification Search
USPC .................................................. 475/159, 160
See application file for complete search history.

(56) References Cited

U.S. PATENT DOCUMENTS

| | | |
|---|---|---|
| 2,684,591 A | 7/1954 | Lundquist |
| 3,160,026 A | 12/1964 | Rosen |
| 3,352,178 A | 11/1967 | Lindgren et al. |
| 3,722,323 A | 3/1973 | Welch |
| 4,583,413 A | 4/1986 | Lack |
| 4,896,499 A | 1/1990 | Rice |
| 5,081,832 A | 1/1992 | Mowill |
| 5,211,541 A | 5/1993 | Fledderjohn et al. |
| 5,302,031 A | 4/1994 | Yuasa |
| 5,391,125 A | 2/1995 | Turra et al. |
| 5,433,674 A | 7/1995 | Sheridan et al. |

(Continued)

FOREIGN PATENT DOCUMENTS

| | | |
|---|---|---|
| EP | 1114949 | 7/2001 |
| EP | 1876338 A2 | 1/2008 |

(Continued)

OTHER PUBLICATIONS

Zalud, "Gears Put a New Spin on Turbofan Performance" Machine Design, Nov. 5, 1998, 2010Penton Media, Inc., 5 pp.

(Continued)

*Primary Examiner* — Derek D Knight
(74) *Attorney, Agent, or Firm* — Carlson, Gaskey & Olds, P.C.

(57) ABSTRACT

A turbine engine includes an input shaft and a fan shaft rotatable about an axis. The fan shaft supports fan blades. An epicyclic gear train is connected between the input shaft and the fan shaft. The epicyclic gear train includes a plurality of star gears, a carrier supporting the plurality of star gears, a sun gear that meshes with the plurality of star gears and a ring gear surrounding and meshing with the plurality of star gears such that the sun gear is rotatable in a first direction and the ring gear is rotatable in a second, opposite direction. The ring gear includes first and second portions that each have an inner periphery with teeth. The first and second portions include respective recesses facing one another to provide an internal annular cavity.

8 Claims, 2 Drawing Sheets

(56) References Cited

U.S. PATENT DOCUMENTS

| | | | |
|---|---|---|---|
| 5,466,198 A | 11/1995 | McKibbin et al. | |
| 5,472,383 A | 12/1995 | McKibbin | |
| 6,223,616 B1 | 5/2001 | Sheridan | |
| 6,402,654 B1 | 6/2002 | Lanzon et al. | |
| 6,530,858 B1 | 3/2003 | Usoro et al. | |
| 6,669,597 B1 | 12/2003 | Usoro et al. | |
| 6,732,502 B2 | 5/2004 | Seda et al. | |
| 7,021,042 B2 | 4/2006 | Law | |
| 7,591,754 B2 | 9/2009 | Duong et al. | |
| 7,662,059 B2 | 2/2010 | McCune | |
| 7,704,178 B2 | 4/2010 | Sheridan et al. | |
| 7,926,260 B2 * | 4/2011 | Sheridan et al. | 60/226.1 |
| 7,950,151 B2 * | 5/2011 | Duong et al. | 475/346 |
| 8,074,440 B2 | 12/2011 | Kohlenberg | |
| 2002/0064327 A1 | 5/2002 | Toda et al. | |
| 2004/0112041 A1 | 6/2004 | Law | |
| 2005/0026745 A1 | 2/2005 | Mitrovic | |
| 2007/0225111 A1 * | 9/2007 | Duong et al. | 475/331 |
| 2008/0006018 A1 | 1/2008 | Sheridan et al. | |
| 2008/0044276 A1 | 2/2008 | McCune et al. | |
| 2008/0116009 A1 | 5/2008 | Sheridan et al. | |
| 2009/0056306 A1 | 3/2009 | Suciu et al. | |
| 2009/0081039 A1 | 3/2009 | McCune et al. | |
| 2009/0090096 A1 | 4/2009 | Sheridan | |
| 2009/0293278 A1 | 12/2009 | Duong et al. | |
| 2009/0298640 A1 | 12/2009 | Duong et al. | |
| 2011/0130246 A1 | 6/2011 | McCune | |

FOREIGN PATENT DOCUMENTS

| | | |
|---|---|---|
| EP | 2224100 | 9/2010 |
| EP | 2559913 A1 | 2/2013 |
| FR | 1357038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

Japanese Office Action for Japanese Application No. 2007-202444, Aug. 3, 2010.

European Search Report for EP Application No. 07253078.5, Dec. 5, 2007.

European Search Report and Written Opinion for European Application No. EP 12 19 8136 completed on Aug. 21, 2013.

International Search Report and Written Opinion for International Application No. PCT/US2012/071906 completed on Aug. 22, 2013.

Dudley ("Gear Handbook: The design, Manufacture, and Application of Gears", p. 3-15).

* cited by examiner

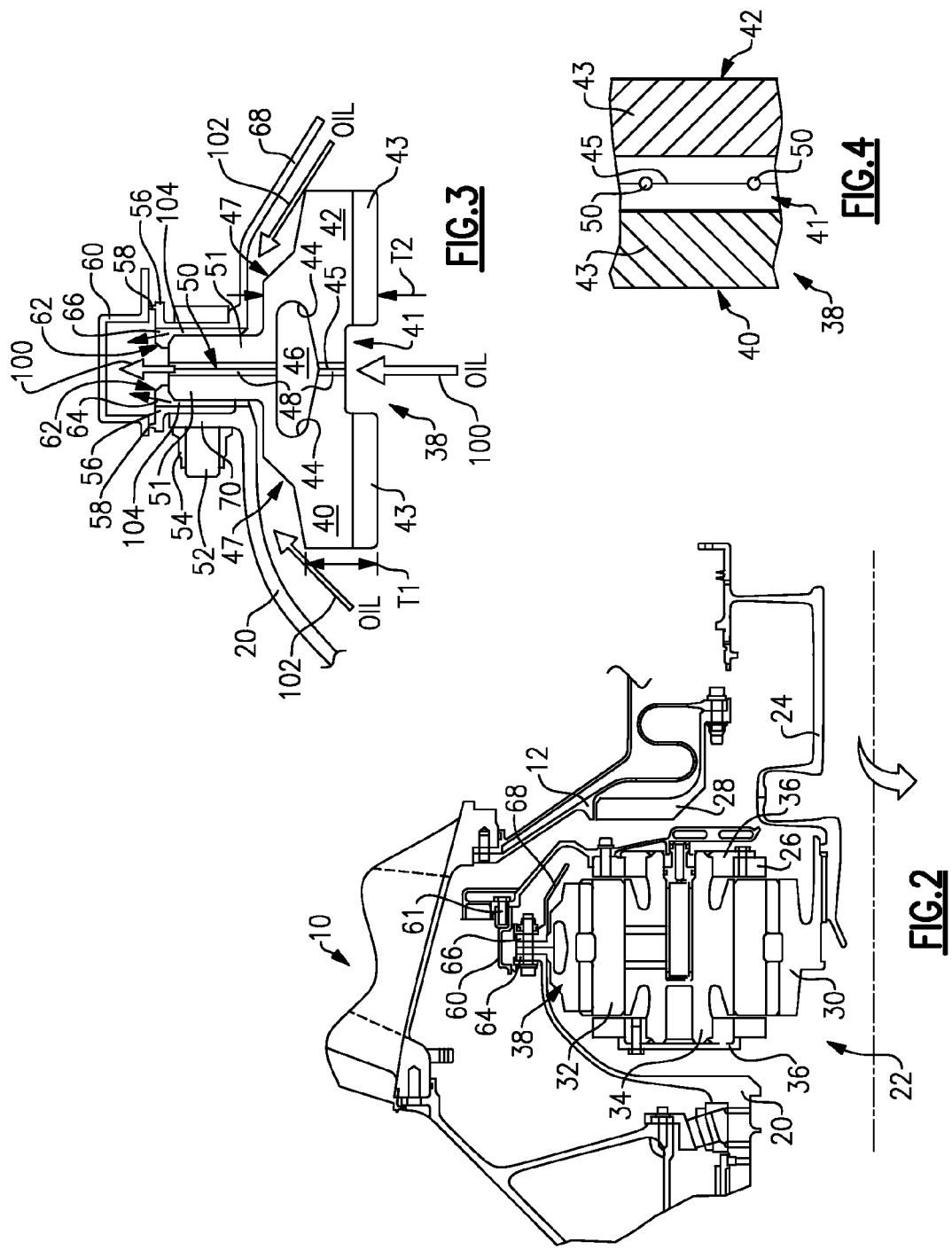

RING GEAR MOUNTING ARRANGEMENT WITH OIL SCAVENGE SCHEME

CROSS REFERENCE TO RELATED APPLICATIONS

The present disclosure is a continuation of U.S. patent application Ser. No. 13/437,442, filed Apr. 2, 2012, which is a continuation of U.S. patent application Ser. No. 11/504,220, filed Aug. 15, 2006.

BACKGROUND

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A turbine engine according to an exemplary aspect of the present disclosure includes, among other things, an input shaft and a fan shaft rotatable about an axis, the fan shaft supporting fan blades, an epicyclic gear train connected between the input shaft and the fan shaft, the epicyclic gear train including a plurality of star gears, a carrier supporting the plurality of star gears, a sun gear that meshes with the plurality of star gears and a ring gear surrounding and meshing with the plurality of star gears such that the sun gear is rotatable in a first direction and the ring gear is rotatable in a second, opposite direction, the ring gear including first and second portions that each have an inner periphery with teeth, wherein the first and second portions of the ring gear have an outer circumferential surface opposite the teeth that provides a first thickness and a second, greater thickness axially inward from the first thickness, and a flange extending radially away from the axis.

In a further non-limiting embodiment of the foregoing turbine engine, the engine may comprise at least one secondary oil collection feature, the at least one secondary oil collection feature having an angled portion, angled relative to the axis, and a radially aligned portion, radially aligned relative to the axis, the radially aligned portion being connected to one of the flanges.

In a further non-limiting embodiment of either of the foregoing turbine engines, the radially aligned portion further may comprise a groove operable to allow oil to pass through a connection between the radially aligned portion and the flange.

In a further non-limiting embodiment of any of the foregoing turbine engines, the secondary oil collection feature may be an oil baffle.

In a further non-limiting embodiment of any of the foregoing turbine engines, the oil baffle may be secured to the flange and balanced with the fan shaft.

In a further non-limiting embodiment of any of the foregoing turbine engines, the secondary oil collection feature may be a portion of the fan shaft.

In a further non-limiting embodiment of any of the foregoing turbine engines, each of the grooves may be at less than or equal to a 45 degree angle relative to the flanges.

In a further non-limiting embodiment of any of the foregoing turbine engines, each of the grooves may be at an approximately zero degree angle relative to the flanges.

In a further non-limiting embodiment of any of the foregoing turbine engines, the at least one secondary oil collection features may consist of a first secondary oil collection feature and a second secondary oil collection feature.

In a further non-limiting embodiment of any of the foregoing turbine engines, the first secondary oil collection may be the fan shaft and the second secondary oil collection feature may be an oil baffle.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION OF THE PREFERRED EMBODIMENT

Figure 1:
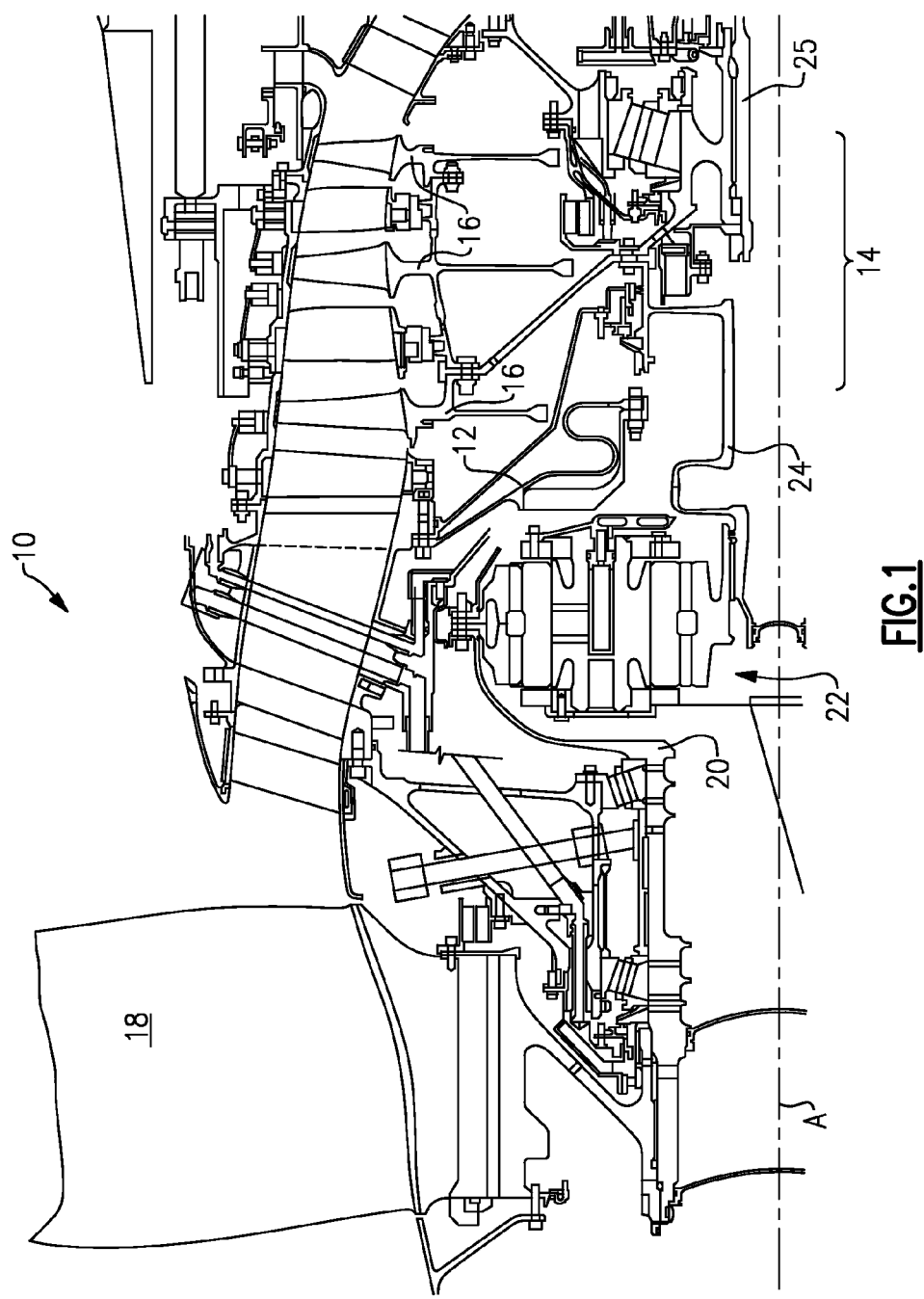
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below. Due to the use of the sun gear 30 in the described arrangement of the epicyclic gear train 22, a worker of ordinary skill in the art would recognize that the sun gear 30 is rotatable in a first direction and the ring gear 38 is rotatable in a second, opposite direction.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

During operation of the turbine engine 10, oil used to cool and lubricate the epicyclic gear train 22 is heated and expelled from the epicyclic gear train 22. Once expelled, the majority of the oil flows through the hole 50 along the oil flow path 100, illustrated by the hollow arrows in FIG. 3. A portion of the oil, however, escapes axially to either side of the first or second portion 40, 42. The heated oil has both a radial and a tangential velocity away from the axis. As the heated oil escapes to either side of the first or second portion, the radial velocity component causes the oil to be propelled radially outward and strike the angled (curved) portion of the turbofan shaft 20, or the angled portion of the oil baffle 68. The radial velocity component pushes the oil radially outward along the turbofan shaft 20 or the oil baffle 68 toward the flanges 70, as illustrated by the secondary oil path 102.

At the flanges 70, the oil passes through grooves 104 in the turbofan shaft 20 or the oil baffle 68, and through the first and second slots 64 in the seals. The grooves 104 are illustrated at a 0 degree angle relative to the adjacent flanges 70, however it is understood that the angular velocity of the oil passing through the grooves 104 can be controlled by altering the angle of the grooves 104 up to a 45 degree angle, relative to the adjacent flanges 70. The oil then drains into the gutter 60. Once entering the gutter 60, the tangential velocity of the oil causes the oil to continue to travel tangentially about the axis through the gutter 60 until the oil encounters a recollection feature that recollects the oil from the gutter 60. In this way, the oil passes to the gutter 60 through a secondary oil collection feature in addition to passing through the hole 50.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   an input shaft and a fan shaft rotatable about an axis, the fan shaft supporting fan blades;
   an epicyclic gear train connected between the input shaft and the fan shaft, the epicyclic gear train including a plurality of star gears, a carrier supporting the plurality of star gears, a sun gear that meshes with the plurality of star gears and a ring gear surrounding and meshing with the plurality of star gears such that the sun gear is rotatable in a first direction and the ring gear is rotatable in a second, opposite direction, the ring gear including first and second portions that each have an inner periphery with teeth, wherein the first and second portions of the ring gear have an outer circumferential surface opposite the teeth that provides a first thickness a second, greater thickness axially inward from the first thickness, and a flange extending radially away from said axis;
   at least one secondary oil collection feature, said at least one secondary oil collection feature having an angled portion, angled relative to said axis, and a radially aligned portion, radially aligned relative to said axis, said radially aligned portion being connected to one of said flange; and
   wherein said radially aligned portion further comprises a groove operable to allow oil to pass through a connection between said radially aligned portion and said flange.

2. The turbine engine of claim 1, wherein said secondary oil collection feature is an oil baffle.

3. The turbine engine of claim 2, wherein said oil baffle is secured to said flange and balanced with the fan shaft.

4. The turbine engine of claim 1, wherein said secondary oil collection feature is a portion of said fan shaft.

5. The turbine engine of claim 1, wherein each of said grooves is at less than or equal to a 45 degree angle relative to the flanges.

6. The turbine engine of claim 5, wherein each of said grooves is at an approximately zero degree angle relative to the flanges.

7. The turbine engine of claim 1, wherein said at least one secondary oil collection features consists of a first secondary oil collection feature and a second secondary oil collection feature.

8. The turbine engine of claim 7, wherein said first secondary oil collection is said fan shaft and said second secondary oil collection feature is an oil baffle.

* * * * *